US00RE34897E

United States Patent [19]

Richardson et al.

[11] E Patent Number: Re. 34,897

[45] Reissued Date of Patent: Apr. 11, 1995

[54] SUSPENSION DEVICE FOR MOTORCYCLE

[76] Inventors: Donald G. Richardson, 13327 Taves Rd., Jackson, Calif. 95642; J. Guy Cazort, 3501 Seabreeze La., Corona Del Mar, Calif. 92625

[21] Appl. No.: 819,962

[22] Filed: May 19, 1992

Related U.S. Patent Documents

Reissue of:

[64] Patent No.: 4,457,393
Issued: Jul. 3, 1984
Appl. No.: 482,921
Filed: Apr. 7, 1983

U.S. Applications:

[63] Continuation of Ser. No. 195,121, Oct. 8, 1980, abandoned.

[30] Foreign Application Priority Data

Oct. 16, 1979 [JP] Japan ..... 54-133303

[51] Int. Cl.[6] ..... B62K 25/04

[52] U.S. Cl. ..... 180/227; 280/284; 267/173

[58] Field of Search ..... 180/227; 280/284, 285, 280/701, 703; 267/230, 228, 173

[56] References Cited

U.S. PATENT DOCUMENTS

| | | | |
|---|---|---|---|
| 1,848,783 | 3/1932 | Horstman | 267/20 R |
| 3,877,539 | 4/1975 | Tilkens | 180/227 |
| 3,907,332 | 9/1975 | Richardson | 280/285 |
| 3,974,892 | 8/1976 | Bolger | 280/284 X |
| 4,058,181 | 11/1977 | Buell | 280/284 X |
| 4,076,271 | 2/1978 | Doncque | 280/284 |
| 4,322,088 | 3/1982 | Miyakoshi | 180/227 X |
| 4,529,056 | 7/1985 | Kreuz | 280/284 X |
| 4,702,338 | 10/1987 | Trema | 280/284 X |
| 4,765,432 | 8/1988 | Odom | 280/284 X |
| 4,789,042 | 12/1988 | Pitts | 280/284 X |
| 4,913,255 | 4/1990 | Takayanagi et al. | 280/284 X |
| 5,011,459 | 4/1991 | Van De Vel | 280/284 X |

FOREIGN PATENT DOCUMENTS

| | | | |
|---|---|---|---|
| 155097 | 7/1938 | Austria | 267/20 R |
| 562966 | 11/1923 | France . | |
| 753260 | 10/1933 | France . | |
| 923235 | 7/1947 | France . | |
| 1196356 | 11/1959 | France . | |
| Ad.77148 | 12/1961 | France . | |
| 53-2839 | 1/1978 | Japan . | |
| 104022 | 2/1917 | United Kingdom . | |
| 122002 | 1/1919 | United Kingdom . | |
| 293941 | 7/1928 | United Kingdom . | |

OTHER PUBLICATIONS

Kawasaki Motor Cycles, Mar. 1976, pp. 83–88.
Roadracing, 1979, p. 82.
Road & Track, Dec. 1974, pp. 105–112.

*Primary Examiner*—Margaret A. Focarino
*Assistant Examiner*—Florian Zeender
*Attorney, Agent, or Firm*—Wagner & Middlebrook

[57] ABSTRACT

Disclosed are suspension devices for motorcycles, in which the rear wheel is rotatively supported by rear ends of right and left side swing arms front ends of which are pivotally connected to rear low-portion of the vehicle frame, one end of a link lever pivotally supported at its center portion by rear upper-portion of the frame is pivotally connected to the swing arms via a rod member at each side of the rear wheel and other end of said link lever is pivotally connected to upper end of a spring member, and lower end of said spring member is pivotally connected to a position of each swing arm.

8 Claims, 4 Drawing Sheets

SUSPENSION DEVICE FOR MOTORCYCLE

Matter enclosed in heavy brackets [ ] appears in the original patent but forms no part of this reissue specification; matter printed in italics indicates the additions made by reissue.

This is a continuation of application Ser. No. 195,121, filed Oct. 8, 1980 now abandoned.

BACKGROUND OF THE INVENTION

Generally, the so-called suspension device for motorcycles is constructed and arranged in such a manner that a rear wheel is rotatively supported by rear ends of two right and left side swing arms front ends of which are pivotally secured to a rear low-portion of the vehicle frame, and at each side of the rear wheel a spring member including a shock absorber is supported between a rear low-portion of the swing arm and a rear top-portion of the vehicle frame, whereby upward and downward movement of the rear wheel with respect to the vehicle frame and damping action against said movement are caused. In the suspension device as mentioned above, however, there are various defects such as that the spring members become considerably obstructive members because of sideward projection thereof at both sides of the rear wheel, underward weight imposed on each swing arm is considerably large because weight of each spring member should be supported by corresponding swing arm, and use of two spring members causes highly expensive design from viewpoint of maintaining balance of the vehicle.

The following patents have been proposed in order to eliminate the defects involved in the general suspension device as mentioned above.

British Pat. No. 104022

U.S. Pat. No. 3,907,332

The suspension device according to said prior patents have a construction such that center portion of a link lever or bell-crank extending frontward and rearward is pivotally supported by a rear top-portion of the vehicle frame, rear portions of two swing arms positioned respectively at each side of the rear wheel and fork-shaped rear ends of said link lever are pivotally connected respectively by two rod members positioned respectively at each side of the rear wheel, and a spring member is supported between front end of the link lever and rear low-portion of the vehicle frame. According to the structure as mentioned above, upward and downward movements of the swing arms are transmitted to the spring member itself through the rod members and the link lever, whereby the following merits are caused. That is to say, members located at both sides of the rear wheel are only the relatively thin and light rod members which do not obstruct said side portions of the rear wheel, use of only one spring member becomes possible thereby to cause low cost of the suspension device, it becomes possible to design the suspension device in such a manner that the force imposed on the rear wheel is transmitted onto the spring member in a suitable lever-ratio, and an effective ratio of the reaction force imposed on the rear wheel from the spring member can be gradually enlarged by utilizing variation of the lever-ratio, said variation being caused by deflection of the link lever, whereby the so-called rising rate spring system can be mechanically obtained.

In the case of the suspension device of the prior patents as mentioned above, however, a new disadvantageous problem occurs. That is to say, since only one spring member is used, the spring member becomes large and wire diameter and wound diameter of the spring member become thick and large. Said spring member have to be arranged within rear portion of the vehicle frame, but other members such as air cleaner should be arranged at said rear portion, and therefore considerably defective influence would be imposed on arrangement of various parts or on maintenance of the vehicle, because said rear portion is originally narrow.

SUMMARY OF THE INVENTION

It is a primary object of the present invention to improve the suspension device according to the prior patents so that the defects involved in said prior arts can be effectively eliminated.

The afore-mentioned object and other objects of the present invention have been attained by a suspension device for motorcycles, wherein two swing arms positioned respectively at both sides of a rear wheel are pivotally secured at their front ends to rear low-portion of the vehicle frame by a laterally horizontal shaft, said rear wheel being rotatively supported by rear ends of said swing arms about a horizontal shaft, a link lever such as a bell-crank extending frontward and rearward is pivotally secured at center portion thereof to rear top-portion of said frame by a laterally horizontal shaft, one end of said lever is pivotally secured to upper ends of two rod members positioned respectively at both sides of said rear wheel, lower ends of said rod members being pivotally connected respectively to said corresponding swing arms, and upper and lower ends of a compression type spring mean are pivotally secured respectively to other end of the link lever and to said swing arms themselves, said pivotal connection of the lower end of the spring means with the swing arms themselves being characteristically significant point in the present invention.

BRIEF DESCRIPTION OF THE DRAWING

In the accompanying drawings, where like reference characters designate like parts.

DETAILED DESCRIPTION OF PREFERRED EXAMPLES OF THE INVENTION

Generally, vehicle frame of any motorcycle has essentially a side contour such as reverse trapezoid or reverse triangle, although there are minor differences in detail.

Figure 1:
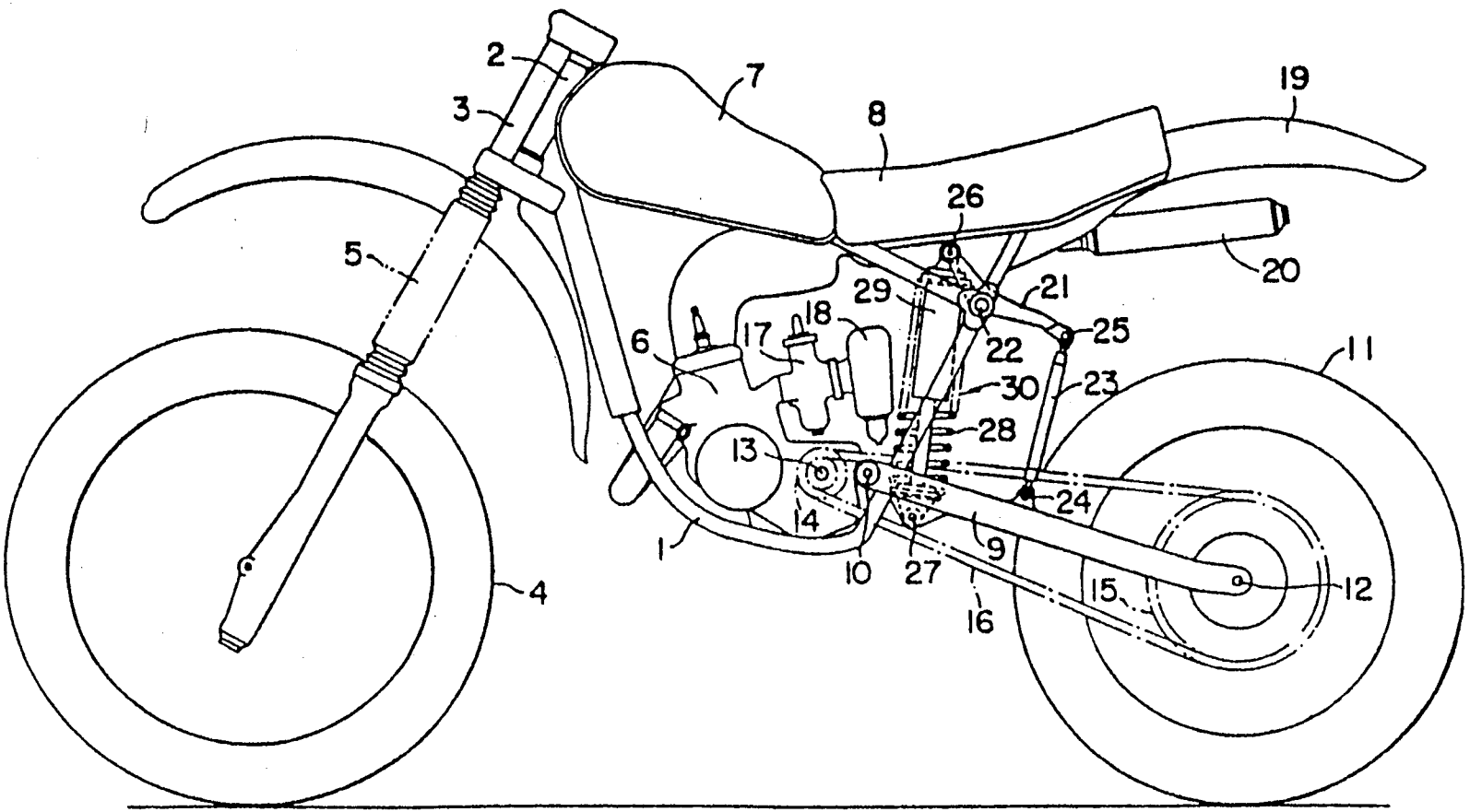
FIG. 1 is a side elevational view showing one example of a motorcycle provided with the suspension device according to the present invention.

Referring to FIG. 1, a front fork 3 supporting a front wheel 4 is secured to front top-portion of the vehicle frame 1 by means of a handle shaft 2, a buffer 5 is provided in said front fork 3, an engine 6 is mounted on a lower intermediate-portion of the frame 1, a fuel tank 7 and a seat 8 are respectively mounted on front and rear portions of the upper portion of the frame 1, two swing arms 9 positioned respectively at both sides of a rear wheel 11 are pivotally secured at their front ends to rear low-portion of the frame 1 by means of a laterally horizontal support shaft 10, said rear wheel 11 being rotatively supported about a horizontal shaft 12 by rear ends of said swing arms, an output shaft 13 of the engine 6 is positioned at a portion separated slightly from the support shaft 10, and an endless chain belt 16 is stretched between a sprocket wheel 14 secured to said output shaft 13 and another sprocket wheel 15 secured to the rear wheel, whereby the rear wheel 11 is driven. Furthermore, the motorcycle is provided with a carburetor 17, an air cleaner 18, a fender 19, and a muffler 20.

The structure as mentioned above is a general structure having been used.

According to the present invention, the suspension device has a structure as mentioned below. That is to say, a link lever 21 or bell-crank extending frontward and rearward is pivotally secured at its central portion to a laterally horizontal support shaft 22, and at each side of the rear wheel 11 upper end of a rod member 23 having a lower end supported pivotally by a pivotal shaft 24 provided at an intermediate portion of the swing arm 9 is pivotally supported by a pivotal shaft 25 provided at rear end of the link lever 21. If locus of the pivotal shaft 24 and that of the pivotal shaft 25 are not positioned in the same plane during deflections of the swing arms 9 and the lever 21, any universal-joints may be used in the place of the pivotal shafts 24 and 25. Furthermore, upper and lower ends of a compression type spring member 30 made of assembly of a coil spring 28 and a shock absorber 29 are pivotally secured respectively to front end of the lever 21 and to front portions of the swing arms 9 by means of horizontal pivotal shafts 26 and 27.

If during driving of the motorcycle provided with the suspension device as mentioned above in connection with FIG. 1, a force for pushing up the rear wheel 11 or pushing down the frame 1 occurs, the swing arms 9 are deflected upward with respect to the frame 1, whereby the rods 23 pivotally secured to the swing arms 9 push up the rear end of the lever 21 thereby to deviate the lever 21 about its pivotal shaft 22 toward anticlockwise direction in FIG. 1, and therefore the front end of the lever 21 depress the upper end of the spring member 30. Simultaneously with said depression, the lower end of the spring member 30 is pushed upward owing to the upward movement of the swing arms 9. As a result of said upward movement of the swing arms 9, the spring member 30 is compressed from both the under and upper sides. In other words, the reaction force of the spring member 30 is imposed on two points at pivotal shafts 24 and 27 of the swing arms 9 so that the swing arms 9 are pushed downward.

Figure 2:
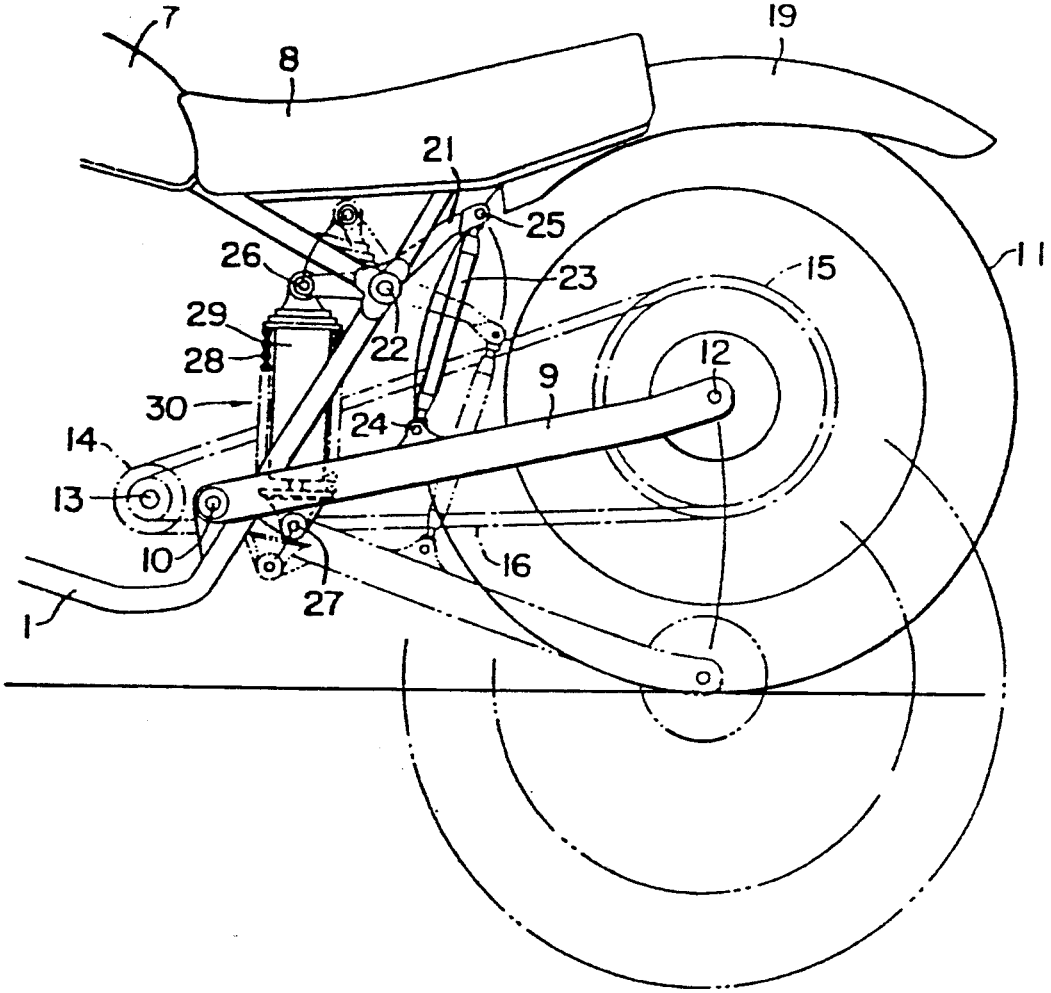
FIG. 2 is a side elevational view of rear portion of the motorcycle shown in FIG. 1, said view showing operational state of the suspension device shown in FIG. 1.

In FIG. 2 is shown a state wherein the swing arms 9 are caused to deflect by maximum stroke thereof. On the other hand, the original state such as shown in FIG. 1 is shown in FIG. 2 by chain lines, so that the state of simultaneous compression of the spring member 30 from upper and under sides will become clear in FIG. 2. The most advantageous merit due to imposition of the reaction force of the spring member 30 on the two portions of the swing arms 9 resides in that accumulated force of the spring member 30 can be designed so as to be small. On the contrary, in the prior arts, the lower end of the spring member 30 is pivotally secured to a lower part of the frame itself, so that the point where the reaction force of the spring member 30 is imposed on the swing arms is only one portion such as the pivotal shaft 24, and therefore if let it be assumed that the spring member having the same dimension is used, it becomes necessary to use a spring member having a large capacity. In the case of the present invention, however, dimension of the spring member 30 can be miniaturized by a degree corresponding to the reaction force imposed on the pivotal shaft 27, said miniaturization of the spring member 30 being very effective from viewpoint of the space distribution. At the rear portion of the frame 1, the air cleaner and other various parts necessary for the motorcycle are generally provided, so that miniaturization of the spring member 30 to be thrust between said various parts is the most significant matter and also the most advantageous merit for the practical use of the so-called suspension system for the motorcycles. The suspension device according to the present invention has other various characteristic features and merits which will be described below in detail.

Figure 3:
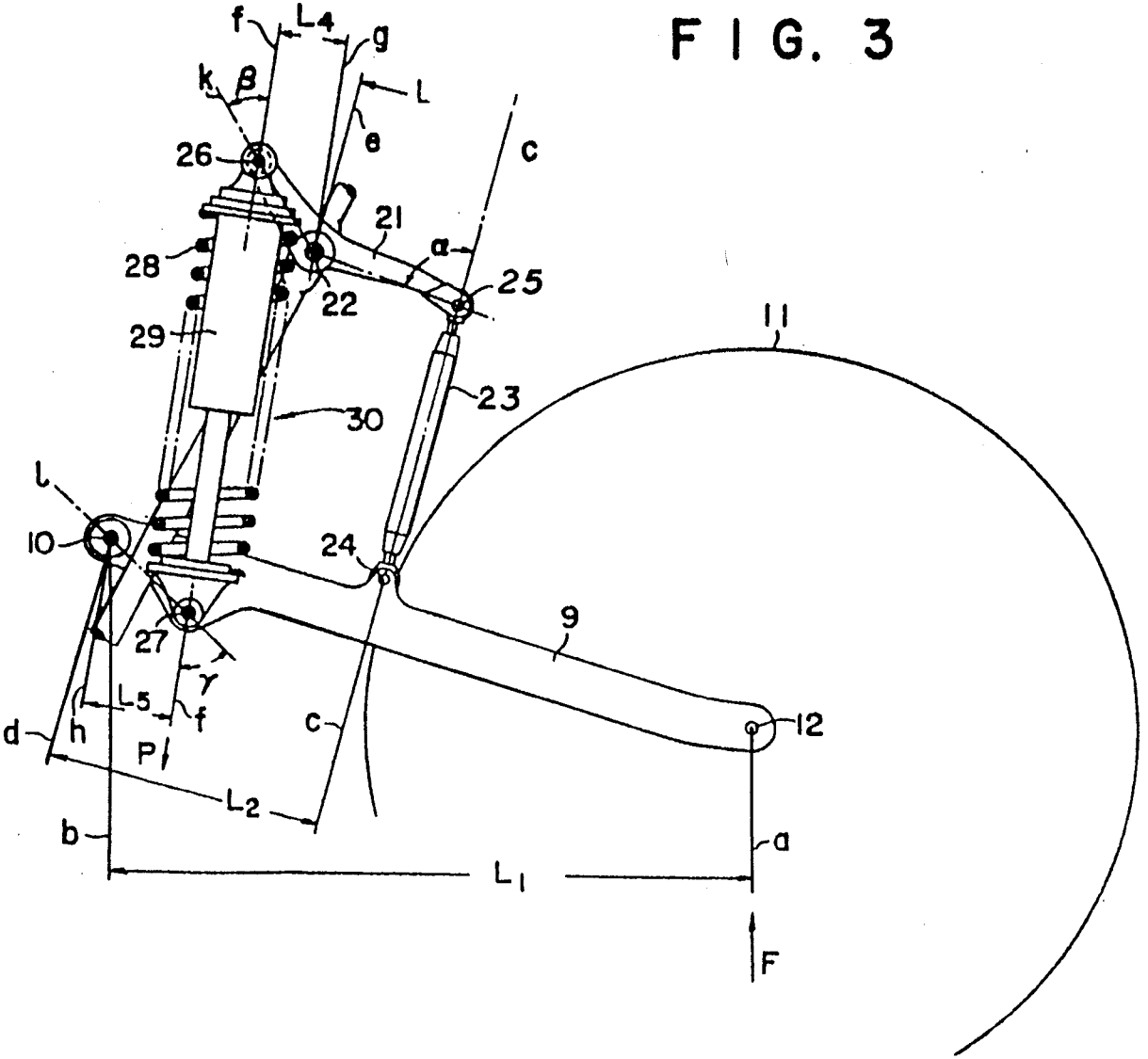
FIG. 3 is a side elevational view adapted for calculating lever ratio of the suspension device shown in FIG. 1.

In FIG. 3, function of the spring member 30 is mathematically shown, wherein F is a force imposed on the motorcycle from outside, P is a repulsive force necessary for the spring member 30, a is a line showing direction of said force F passing through the shaft 12 of the rear wheel 11, b is a line passing through the shaft 10 of the swing arms 9 and being parallel to said line a, c is a line for connecting centers of the pivotal shafts 24 and 25 provided at both ends of the rods 23, d is a line passing through the center of the shaft 10 of the swing arms 9 and being parallel to the line c, e is a line passing through the center of the pivotal shaft 22 of the lever 21 and being parallel to the line c, f is a line for connecting centers of the upper and lower pivotal shafts 26 and 27 of the spring member 30, g is a line passing through the center of the shaft 22 of the lever 21 and being parallel to the line f, h is a line passing through the center of the shaft 10 of the swing arms 9 and being parallel to the line f, $L_1$ is a distance between the lines a and b, $L_2$ is a distance between the lines c and d, $L_3$ is a distance between the lines c and e, $L_4$ is a distance between the lines f and g, and $L_5$ is a distance between the lines f and h. From FIG. 3, the following equation (1) is established, $$P = \frac{L_1}{\frac{L_2 \cdot L_4}{L_3} + L_5} \cdot F \qquad (1)$$

According to the equation (1), it is clear that the more the distance $L_5$ is large, the more the repulsive force P becomes small.

In the prior suspension device for motorcycles, however, the lower end of the spring member 30 is directly secured to the frame 1 itself, so that the distance $L_5$ becomes zero ($L_5=0$) and the equation (1) is converted to the following equation (2), wherein the repulsive force P is replaced by P'.

$$P' = \frac{L_1}{\frac{L_2 \cdot L_4}{L_3}} \cdot F \qquad (2)$$

Figure 4:
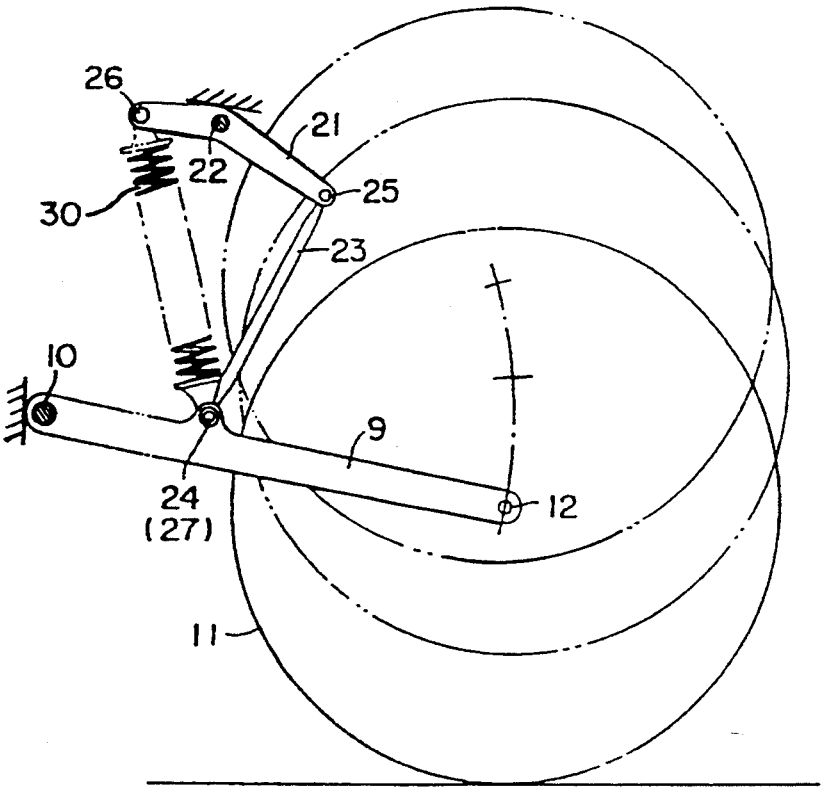
FIG. 4 is a side elevational view showing one portion of another example of the suspension device according to the present invention, wherein a pivotal shaft for pivotally connecting a spring member with swing arms coincides with a pivotal shaft for connecting rod members with the swing arms.

As clear from comparison between the equations (1) and (2), it has been proved that P' becomes larger than P ($P<P'$). Accordingly, when the distance $L_5$ is made larger without variation of the repulsive force P, the distance $L_2$ can be made smaller by a degree corresponding to increase of said distance $L_5$. That is to say, it becomes possible to displace frontward the position of the pivotal shaft 24 connecting pivotally the swing arms 9 with the rods 23. As a result of said fact, if the distance $L_2$ is made equal to the distance $L_5$($L_2=L_5$), then the pivotal shafts 24 and 27 can be located at the same position, as shown in FIG. 4. On the other hand, if the pivotal shaft 24 is located in front of the middle position of the swing arm 9, the rods 23 and the lever 21 can be displaced frontward, whereby the rear end of the lever 21 and the rods 23 can be protected from interference with the rear wheel 11 itself. Consequently, although there is no Fig., the rods 23 of a pair can be unified as one rod and located in front of the rear wheel 11. On this occasion, the fork-shaped rear end of the lever 21 can be unified without division thereof into fork-shape, whereby it becomes possible to increase the rigidity of the lever 21.

Figure 5:
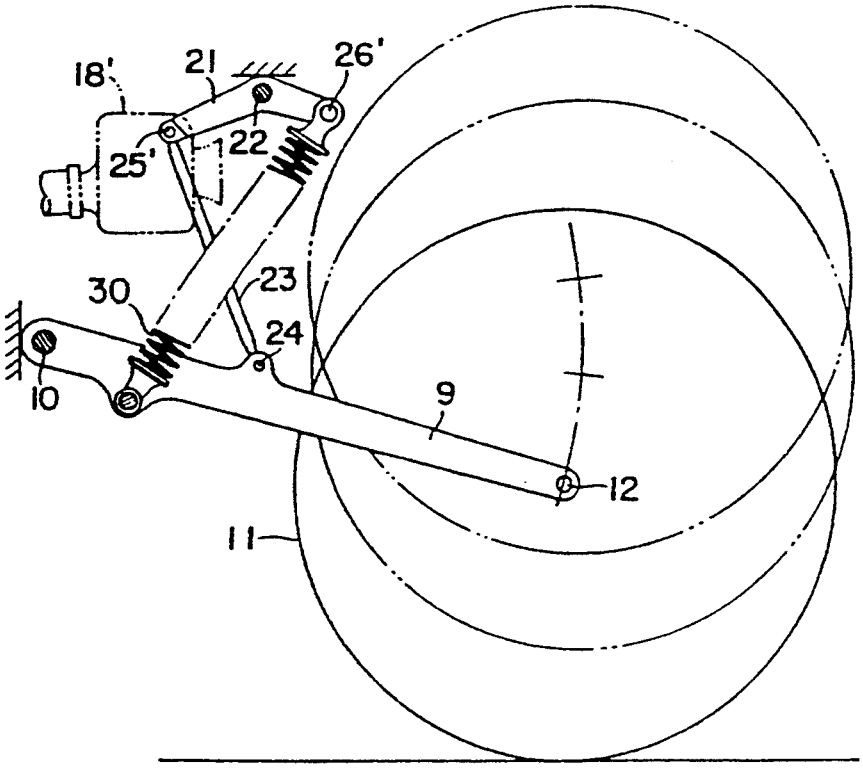
FIG. 5 is a side elevational view showing a part of a further example of the suspension device according to the present invention, wherein the rod members and the spring member are arranged so as to form X-shaped cross state.

Furthermore, since the pivotal shaft 24 can be located at a front position of each swing arm 9, as shown in FIG. 5, the upper end of each rod 23 can be pivotally secured to the front end of the lever 21 by a pivotal shaft 25' and the upper end of the spring member 30 can be pivotally secured to the rear end of the lever 21 by a pivotal shaft 26', whereby X-shaped cross state of the rods 23 and the spring member 30 can be easily obtained without any trouble. According to the X-shaped arrangement of the rod members 23 and the spring member 30, it becomes possible to secure a large space for the arrangement of various parts such as the air-cleaner 18' because of rearward inclination of the spring member 30. In this structure, it is possible to arrange the both pivotal shafts 24 and 27 at the same position or at adjacent positions, as described in connection with FIG. 4.

In addition, as will be understood from FIG. 3, if the lines connecting respectively the center of the support shaft 22 with the centers of the pivotal shafts 25 and 26 are respectively shown by i and k, the cross-angle $\alpha$ between the lines i and c and the cross-angle $\beta$ between the lines k and f are varied in accordance with deflection of the lever 21, thus causing variation of the lengths of the distances $L_3$ and $L_4$. In the case of FIG. 3, $\beta$ is an acute angle, so that the distance $L_4$ increases largely in accordance with arrowward deflection of the lever 21. As will be clear from the equation (1), increase of the force F causes increase of the distance $L_4$, so that it becomes possible to design the so-called rising rate spring system, wherein the reaction force of the spring member 30 increases in accordance with increase of displacing stroke of the rear wheel 11. In addition, in the suspension device according to the present invention, the distance $L_5$ is varied in accordance with deflection of the swing arms 9, because the cross-angle $\gamma$ between the line f and the line l connecting center of the support shaft 10 of the swing arms 9 with center of the pivotal shaft 27 is varied in accordance with said deflection of the swing arms. In the case of FIG. 3, the angle $\gamma$ is increased in accordance with upward deflection of the swing arms 9 thereby to increase the distance $L_5$. This increase also acts on the rising rate, as will be clear from the equation (1). That is to say, not only the distances $L_4$ and $L_3$ but also the distance $L_5$ can be participated in generation of the rising rate which is favorable for the suspension device of motorcycles. In the prior arts, the necessary rising rate is obtained by adoption of acute angle $\beta$, but in the case of the present invention the angle $\beta$ having soft acuteness can be adopted owing to additional function of the distance $L_5$, whereby bending for the spring member 30 can be softened and smooth motion of the shock absorber can be advantageously obtained.

We claim:

1. In a suspension device for motorcycles, wherein a pair of swing arm portions positioned respectively at each side of a rear wheel are pivotally secured at their front ends to rear low-portion of the vehicle frame by a laterally horizontal shaft, said rear wheel being rotatively supported by rear ends of said swing arm portions about a horizontal shaft, a link lever extending frontward and rearward is pivotally secured at intermediate portion thereof to rear upper-portion of said frame by laterally horizontal shaft, one end of the link lever is pivotally secured to upper end of at least one rod member which is pivotally connected, at its lower end, to said swing arm portions and upper end of compression type spring means is pivotally secured to other end of said link lever; an improvement wherein lower end of at least one rod member is connected at an intermediate part of the swing arm portions in its longitudinal direction, lower end of said spring means is pivotally connected directly to a position on the swing arm portions between front end of the swing arm portions and the connecting point at which the lower end of said rod member is connected to the swing arm portions and said compression type spring means have a single spring member and a single shock absorber member.

2. A suspension device according to claim 1, wherein the rear end of said link lever is connected to two rod members, lower ends of which are pivotally connected to said swing arm portions respectively.

3. A suspension device according to claim 1, wherein the rear end of said link lever is connected to one rod member, lower end of which is pivotally connected to said swing arm portions in a position in front of the rear wheel.

4. A suspension device according to claim 1, wherein a line connecting centers of upper and lower pivotal shafts of the spring means and a line connecting center of the upper pivotal shaft of the spring means and center of the support shaft of the link lever are crossed so as to form an acute angle at front upper-side thereof and a line connecting centers of the upper and lower pivotal shafts of the spring means and a line connecting center of the lower pivotal shaft of the spring means and center of the horizontal shaft of the swing arm portions are crossed so as to form an acute angle at front upper-side thereof, wherein each of two acute angles is made to increase toward right angle in accordance with upward deflection of the swing arms.

5. In a suspension device for motorcycles, wherein a pair of swing arm portions positioned respectively at each side of a rear wheel are pivotally secured at their front ends to rear low-portion of the vehicle frame by a laterally horizontal shaft, said rear wheel being rotatively supported by rear ends of said swing arm portions about a horizontal shaft, a link lever extending frontward and rearward is pivotally secured at intermediate portion thereof to rear upper-portion of said frame by laterally horizontal shaft, one end of the link lever is pivotally secured to upper end of at least one rod member which is pivotally connected, at its lower end, to said swing arm portions, and upper end of compression type spring means is pivotally secured to other end of said link lever; an improvement wherein lower end of at least one rod member is connected at an intermediate part of the swing arm portions in its longitudinal direction, the lower end of the rod member and the lower end of the spring means are pivotally connected to same position or to adjacent positions of the swing arm portions in its longitudinal direction and said compression type spring means have a single spring member and a single shock absorber member.

6. A suspension device according to claim 1, wherein the rear end of said link lever is connected to two rod members, lower ends of which are pivotally connected to said swing arm portions respectively.

7. The suspension device according to claim 6, wherein a line connecting centers of upper and lower pivotal shafts of the spring means and a line connecting center of the lower pivotal shaft of the spring means and center of the horizontal shaft of the swing arm portions are crossed so as to form an acute angle at front upper-side thereof, whereby said acute angle is made to increase toward right angle in accordance with upward deflection of the swing arms.

8. A suspension device according to claim 5, wherein the rear end of said link lever is connected to one rod member, lower ends of the rod member and the spring means are pivotally connected to the swing arm portions at a position in front of the rear wheel.

[9. In a suspension device for motorcycles, wherein a pair of swing arm portions positioned respectively at each side of a rear wheel are pivotally secured at their front ends to rear low-portion of the vehicle frame by a laterally horizontal shaft, said rear wheel being rotatively supported by rear ends of said swing arm portions about a horizontal shaft, a link lever extending frontward and rearward is pivotally secured at intermediate portion thereof to rear upper-portion of said frame by laterally horizontal shaft, one end of the link lever is pivotally secured to upper end of at least one rod member which is pivotally connected, at its lower end, to said swing arm portions and upper end of compression type spring means is pivotally secured to other end of said link lever; an improvement wherein said compression type spring means have a single spring member and a single shock absorber, the front end of the link member and an intermediate part of the swing arm portions are pivotally connected by at least one rod member at two sides of the rear wheel and the rear end of the link lever and the front portion of the swing arm portions are pivotally connected by the spring means, whereby an X-shaped cross arrangement of the rod members and spring means is provided.]

* * * * *